US006499341B1

(12) United States Patent
Lodise et al.

(10) Patent No.: US 6,499,341 B1
(45) Date of Patent: Dec. 31, 2002

(54) MOTORCYCLE HAVING SYSTEM FOR DETERMINING ENGINE PHASE

(75) Inventors: V. Dennis Lodise, Pewaukee, WI (US); Eric Norppa, Pewaukee, WI (US); Barth Fisk, Fishers, IN (US)

(73) Assignee: Harley-Davidson Motor Company Group, Inc., Milwaukee, WI (US)

( * ) Notice: Subject to any disclaimer, the term of this patent is extended or adjusted under 35 U.S.C. 154(b) by 0 days.

(21) Appl. No.: 09/620,014

(22) Filed: Jul. 20, 2000

(51) Int. Cl.[7] .......... G01M 15/00
(52) U.S. Cl. .......... 73/117.3
(58) Field of Search .......... 73/116, 117.3; 123/424; 701/110; 364/431.03

(56) References Cited

U.S. PATENT DOCUMENTS 5,562,082 A * 10/1996 Norppa et al. .......... 123/424
6,070,567 A * 6/2000 Kakizaki et al. .......... 73/116

* cited by examiner

*Primary Examiner*—Benjamin R. Fuller
*Assistant Examiner*—Maurice Stevens
(74) *Attorney, Agent, or Firm*—Michael Best & Friedrich LLP

(57) ABSTRACT

A system for determining engine phase in a motorcycle engine includes a crank gear sensor mounted near the crank gear of the engine, a pressure sensor mounted on the air intake manifold of the engine, and a processor communicating with the crank gear sensor and the pressure sensor. First and second groups of crank gear teeth pass by the crank gear sensor before either of the first and second pistons of the engine reaches TDC. A third group of crank gear teeth passes by the crank gear sensor before the first piston reaches TDC, but after the second piston reaches TDC. At low rpm, such as at start up, the processor determines the phase of the engine during a single rotation of the crankshaft by measuring and comparing the time periods taken by the group of teeth to pass by the crank gear sensor. At high rpm, the processor determines the phase of the engine using the pressure sensor.

6 Claims, 4 Drawing Sheets

MOTORCYCLE HAVING SYSTEM FOR DETERMINING ENGINE PHASE

FIELD OF THE INVENTION

The invention relates to an apparatus and method for determining the phase of a motorcycle engine.

BACKGROUND

Four-stroke internal combustion engines include a piston reciprocating in a cylinder. The piston executes four strokes or phases for each cycle of the engine. The phases are compression, expansion, exhaust, and intake. The piston moves in a first direction during the compression and exhaust strokes, and in a second, opposite direction during the expansion and intake strokes. A spark plug is positioned at least partially in the cylinder's combustion chamber and is used to ignite a combustible mixture in the combustion chamber near the end of the compression stroke to drive the piston on the subsequent expansion stroke.

In some engines, the spark plug is timed to spark each time the piston approaches or reaches top-dead-center (TDC). Because the piston reaches TDC twice during each cycle, this known arrangement causes the spark plug to activate twice for each cycle, once during the compression stroke and again during the exhaust stroke. During the exhaust stroke, products of combustion are exhausted from the cylinder, and there is no combustible mixture in the combustion chamber. Thus, activating the spark plug during the exhaust stroke is a waste of energy and may reduce the longevity of the spark plug.

It is also known to mount a sensor near the cam shaft of a motorcycle engine to determine the phase of the engine. Because the cam shaft rotates once for each four-stroke cycle of the motorcycle engine, the sensor is able to determine the phase of the engine by sensing the position of the cam shaft (e.g., counting the teeth on a cam gear).

It is also known to mount a crank gear sensor near a crank gear of an engine, and monitor the rotation of the crankshaft to determine the engine phase. For example, in U.S. Pat. No. 5,562,082, a crank gear sensor is used to measure the rotational speed of the crankshaft both before and after one of the pistons reaches TDC in the first rotation of the crankshaft. The disclosed method for measuring the crankshaft speed includes measuring the time it takes for two groups of crank gear teeth to pass the crank gear sensor. One of the groups of teeth passes the crank gear sensor prior to the piston reaching TDC, and the other group passes by the crank gear sensor after the piston has reached TDC. Based on the ratio of the measured rotational speeds, a processor determines the phase of the engine, and activates the appropriate spark plugs at the appropriate times beginning with the second crankshaft rotation.

SUMMARY

The present invention is an improvement over the system disclosed in U.S. Pat. No. 5,562,082, and is for use in a two-cylinder uneven firing engine, particularly of the V-twin type. Because the system of U.S. Pat. No. 5,562,082 measures the rotational speed of the crankshaft only before and after top-dead-center (TDC), it misses the opportunity to spark that cylinder during the first rotation of the crankshaft. An engine incorporating a system according to the present invention remedies this problem by measuring the rotational speed of the crankshaft at selected angular positions of the crankshaft. The system compares the measured rotational speeds to determine the engine phase, and activates the appropriate spark plug. In most cases, the spark plug is activated during the first rotation of the crankshaft.

To achieve the above-described function, the present invention provides a motorcycle including a frame and an engine mounted to the frame. The engine includes a housing, a crankshaft mounted for rotation within the housing, first and second (e.g., front and rear, respectively) cylinders, and first and second pistons in the first and second cylinders, respectively. The pistons reciprocate within the cylinders in a four stroke combustion cycle to rotate the crankshaft. A crankshaft velocity sensor is provided and positioned to monitor the rotational speed of the crankshaft. A processor is interconnected with the crankshaft velocity sensor, and is programmed to measure the rotational speed of the crankshaft at selected times during the crankshaft rotation. Based on the measured crankshaft speeds, the processor determines the phase of the engine and sparks the appropriate spark plug during a single rotation of the crankshaft.

Preferably, a crank gear is coupled to (e.g., mounted on) the crankshaft for rotation therewith. Preferably, the crankshaft velocity sensor is a crank gear sensor mounted near the crank gear. The crank gear sensor counts the teeth of the crank gear as the crank gear rotates. The crank gear sensor and the processor measure the time taken by first and second groups of teeth to pass by the crank gear sensor before either piston reaches TDC. The processor compares (e.g., calculates the difference between) the first and second time periods and determines whether the second piston is in the compression or exhaust stroke or phase.

If the difference between the first and second time periods is insufficient to determine engine phase, the processor measures a third time period during which a third group of crank gear teeth pass by the sensor. The third group of crank gear teeth pass by the sensor before the first piston reaches TDC, but after the second piston has reached TDC. The processor then compares the third time period to the second time period to determine the phase of the engine and spark the appropriate spark plug during a single rotation of the crankshaft.

The present invention also provides a method for determining the phase of an engine. The method includes monitoring the rotational speed of the engine's crankshaft and monitoring the pressure in the intake manifold. At low rpm, the engine phase is determined with a crankshaft velocity sensor as described above. At higher rpm, the engine phase may be determined by monitoring a variable corresponding to the pressure in the air intake manifold. The method includes switching between monitoring the crankshaft velocity and the manifold pressure to determine engine phase depending on the engine speed.

Preferably, the manifold pressure is measured with a pressure sensor mounted on the shared air intake manifold that provides air to the cylinders. The pressure sensor is interconnected with the processor, so that the processor can take air pressure measurements. The processor takes a pressure reading at a selected time during each rotation of the crankshaft. By comparing measured air intake manifold pressures of two or more crankshaft rotations, the processor can determine the phase of the engine and resynchronize the engine.

Alternatively, if the engine includes dedicated or individual throttle bores for the cylinders, a pressure sensor may be mounted on one or more of the bores and sense the manifold pressure associated with a particular cylinder.

When the manifold pressure for a cylinder drops below a certain threshold, the processor determines that the piston is executing the intake stroke and resynchronizes the engine. In this case, engine phase synchronization is possible in a single crankshaft revolution.

Other features and advantages of the invention will become apparent to those skilled in the art upon review of the following detailed description, claims, and drawings.

Figure 1:
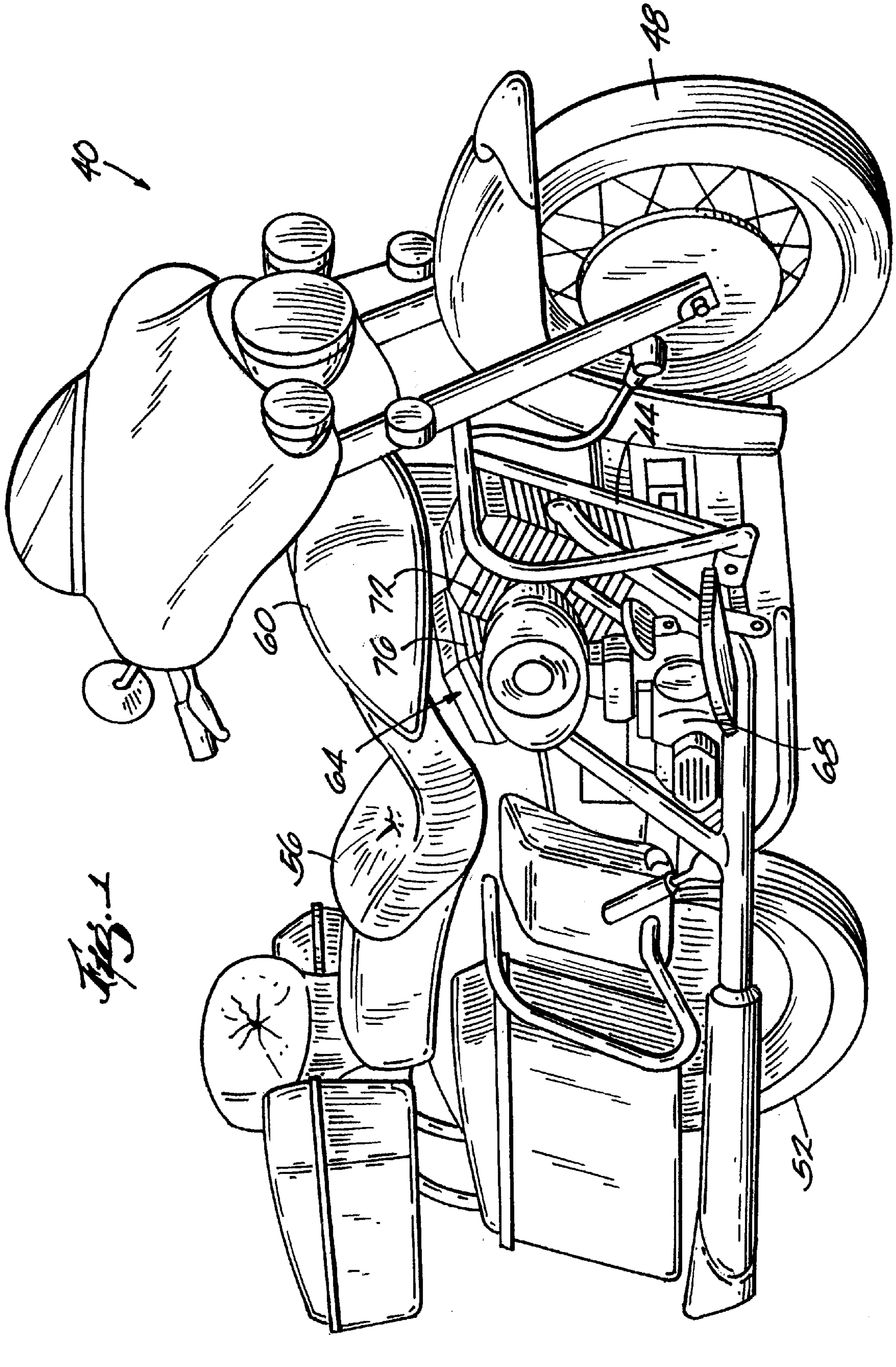
FIG. 1 is a perspective view of a motorcycle embodying the present invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify elements of a method or process is simply for identification and is not meant to indicate that the elements should be performed in a particular order.

DETAILED DESCRIPTION

FIG. 1 illustrates a motorcycle 40 including a frame 44, front and rear wheels 48, 52, a seat 56, a fuel tank 60, and an engine 64. The front and rear wheels 48, 52 rotate with respect to the frame 44 and support the frame 44 above the ground. The engine 64 is mounted to the frame 44 and drives the rear wheel 52 through a transmission 68 and drive belt (not shown). The seat 56 and fuel tank 60 are also mounted to the frame 44.

Although the illustrated engine 64 is an air-cooled V-twin engine having first and second cylinders 72, 76, the invention may be embodied in other types of engines 64, such as single-cylinder or multi-cylinder engines of either the water-cooled or air-cooled variety. Additionally, although the drawings illustrate the first and second cylinders 72, 76 as the front and rear cylinders, respectively, the invention may be embodied in an engine that has the cylinders positioned side-by-side rather than one behind the other. The invention may also be used in an engine that is not a V-twin engine, however, the invention works best in a V-twin, uneven firing engine. The term "uneven firing," as used herein, means that the cylinders fire at unevenly spaced intervals during the rotation of the crankshaft, as compared to even firing engines which fire at evenly spaced intervals (e.g., every 180° of crankshaft rotation for a two cylinder engine).

Figure 2:
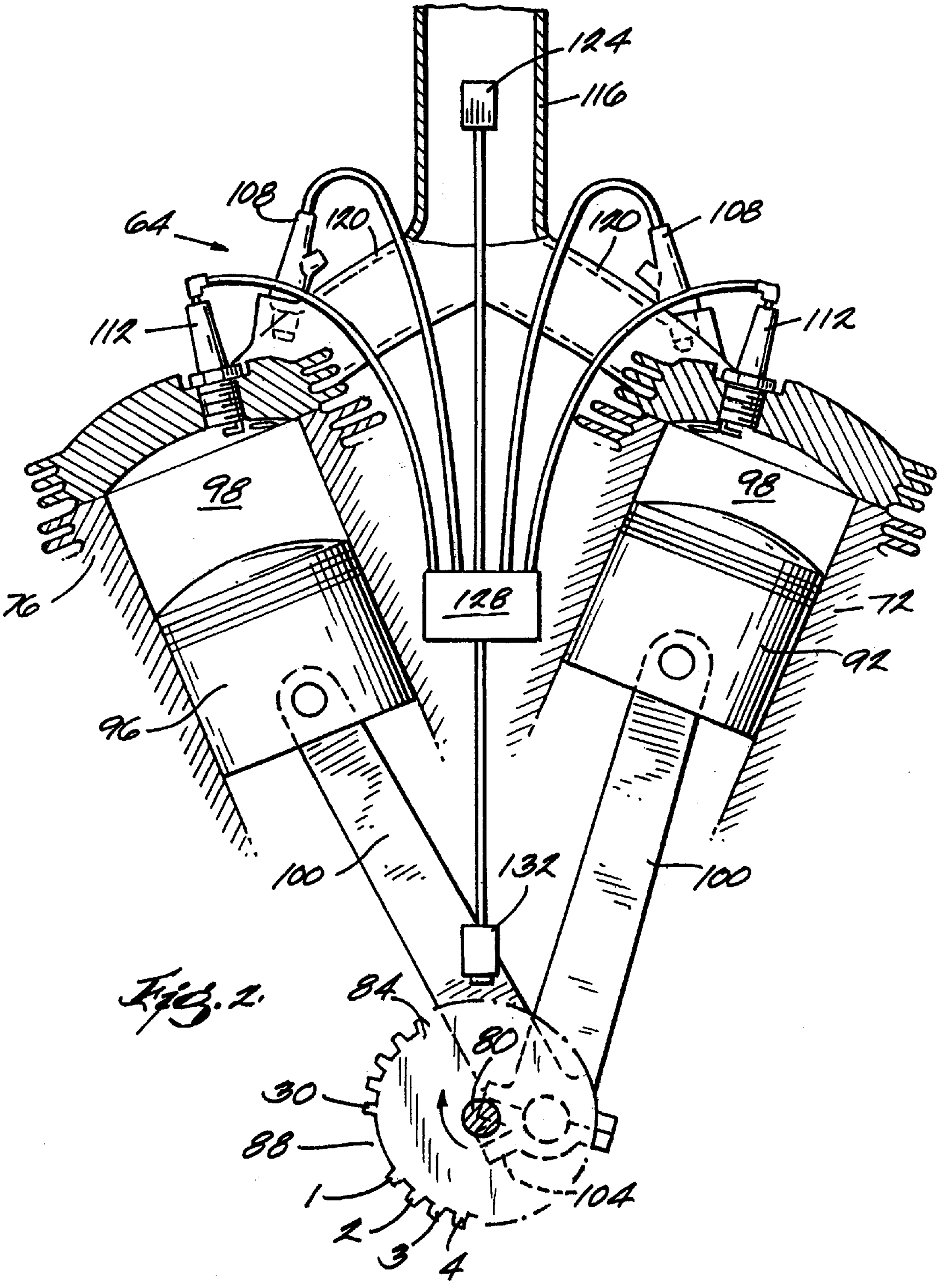
FIG. 2 is a schematic representation the motorcycle engine illustrated in FIG. 1.

Referring to FIG. 2, the engine 64 includes a crankshaft 80 having a crank gear 84 mounted thereto for rotation therewith. The illustrated crank gear 84 has teeth sized and spaced to provide thirty-two (32) teeth around the circumference of the crank gear 84. Two of the teeth have been removed, and provide a space on the crank gear 84, the space being referred to herein as an indicator 88. In this regard, the crank gear 84 includes thirty (30) teeth and an indicator 88 occupying the space where two additional teeth have been removed or not provided. Alternatively, the indicator 88 may be provided by an extra tooth on the crank gear 84 or any other suitable device for indicating a specific location on the crankshaft 80.

Figure 3:
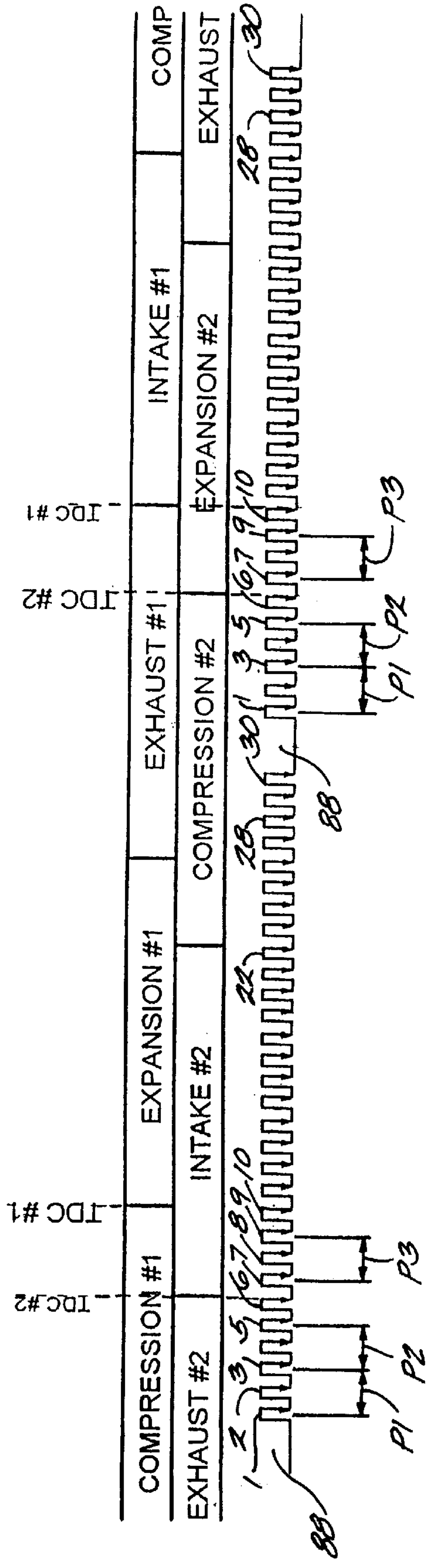
FIG. 3 is a schematic illustration of the engine cycle of the motorcycle of FIG. 1.

The teeth are shown schematically in FIG. 3, with selected teeth identified by their tooth numbers 1–30. FIG. 3 illustrates the full four-stroke cycle of the engine 64, which includes two rotations of the crankshaft 80. Of course more or fewer than 32 teeth could be provided.

Referring again to FIG. 2, the first and second cylinders 72, 76 include first and second pistons 92, 96, respectively, connected to the crankshaft 80 with connecting rods 100. The first and second cylinders 72, 76 have combustion chambers 98. The illustrated crankshaft 80 has a single crankpin 104 to which both of the connecting rods 100 are attached. The engine 64 also includes a fuel injector 108 and spark plug 112 for each cylinder 72, 76, and an air intake manifold 116 communicating with the two cylinders 72, 76 through a splitter or dual runner 120. A pressure sensor 124 is mounted on the air intake manifold 116 to measure pressure within the manifold 116. The pressure sensor 124 communicates with a processor 128 through a wire; the processor 128 includes a memory storage capability. Alternatively, the pressure sensor 124 may be replaced with another sensor that measures a variable corresponding to the flow of air into the cylinders 72, 76.

A crankshaft velocity sensor in the form of a crank gear sensor 132, which is preferably a variable reluctance (VR) sensor, is mounted on the engine 64 near the crank gear 84 and communicates with the processor 128 through a wire. The crank gear sensor 132 senses when a gear tooth is moved past it. The indicator 88 provides a point of reference for the crank gear sensor 132 to begin counting teeth. As indicated in FIG. 2, the crank gear 84 rotates clockwise with the crankshaft 80, such that tooth 1 is the first tooth to pass by the crank gear sensor 132 after the indicator 88, and tooth 30 is the last tooth to pass by the crank gear sensor 132 before the indicator 88 comes around again. Alternatively, any other sensor that measures a variable corresponding to the rotational speed of the crankshaft 80 may be used in place of the crank gear 84 and crank gear sensor 132. Such systems are known in the art.

Rotation of the crankshaft 80 is caused by the pistons 92, 96 reciprocating within the respective cylinders 72, 76. As is well known in the art, the crankshaft 80 rotates twice for each four stroke cycle of the engine 64. The pistons 92, 96 reach top-dead-center (TDC) and bottom-dead-center twice for each cycle. When one of the pistons 92, 96 reaches TDC, the piston 92, 96 is at the end of either the compression or exhaust phase or stroke of the cycle. If the piston 92, 96 is in the compression stroke, the spark plug 112 is activated by the processor 128 to cause combustion in the associated cylinder 72, 76. If the piston 92, 96 is in the exhaust stroke, there is no need or reason to activate the spark plug 112 in the associated cylinder 72, 76.

As the pistons 92, 96 move in the above-described four stroke cycle, the pistons 92, 96 move at different speeds depending on the stroke, which results in changes in the rotational speed of the crankshaft 80. For example, as a piston 92, 96 approaches TDC in the compression stroke, the piston slows down as the gases are compressed in the cylinder. Then the piston 92, 96 quickly accelerates in the opposite direction during the expansion stroke due to the ignition of the gases and the resulting explosion. The piston 92, 96 does not slow down significantly as it reaches TDC during the exhaust stroke, because the exhaust valve is open to force the products of combustion out of the cylinder 72, 76 after the expansion stroke. Nor does the piston 92, 96 slow down appreciably during the intake stroke, because the intake valve is open.

During the intake stroke, air is drawn into the cylinders 72, 76 through the air intake manifold 116 and opened intake valves. Thus, the MAP drops in the air intake manifold 116 during the intake stroke of each piston 92, 96. During the compression, expansion, and exhaust strokes, the intake valves are closed, and MAP is maintained relatively high compared to MAP during the intake stroke.

Figure 4:
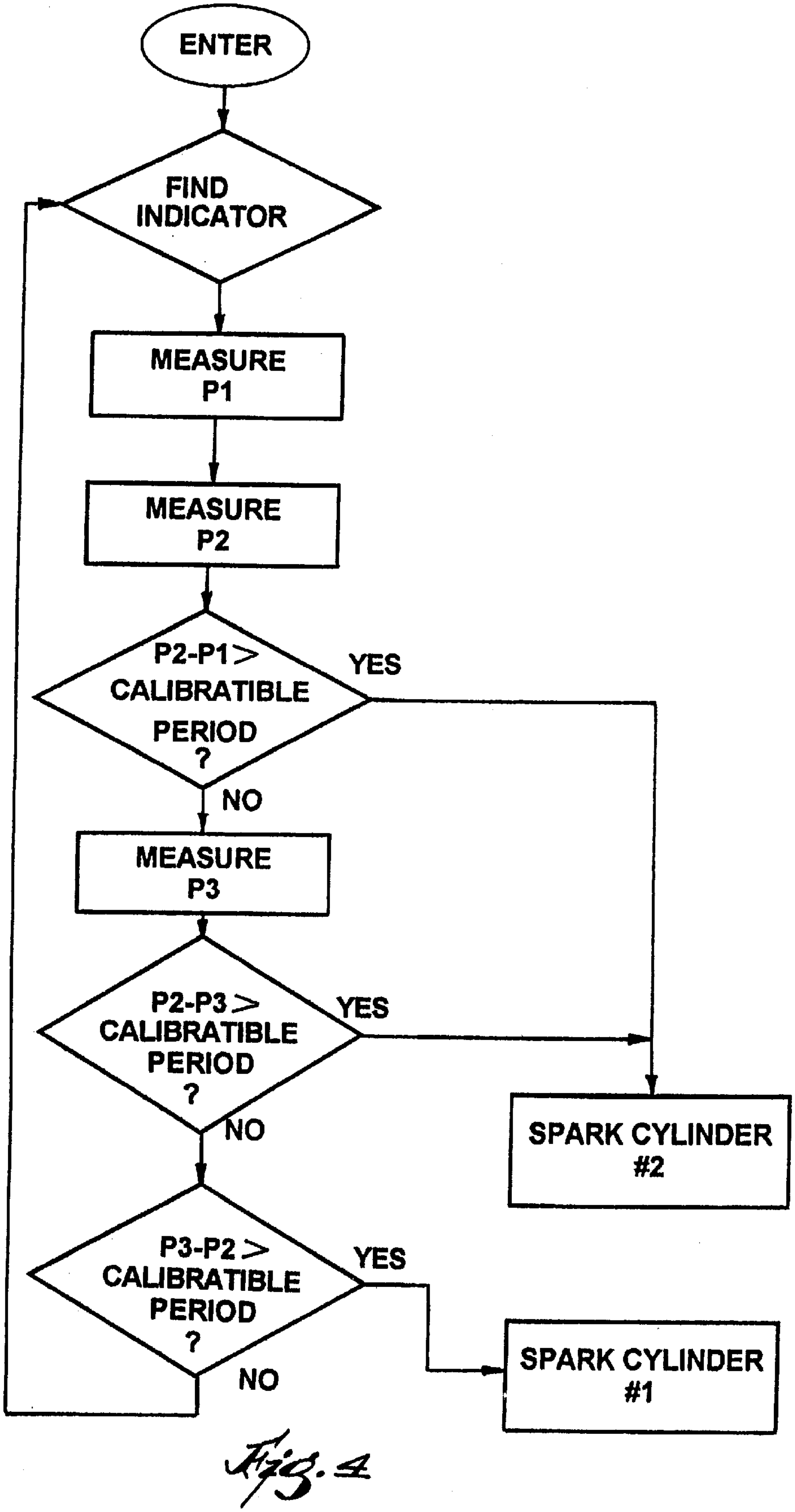
FIG. 4 is a flow chart illustrating the logic of the processor used in the motorcycle of FIG. 1.

The operation of the phase determining system will now be explained with reference to FIGS. 3 and 4. Phase is determined at lower rpm (e.g., at startup and at speeds up to about 2500 rpm) with the crank gear sensor 132, and is determined at higher rpm (e.g., above about 2500 rpm) with the pressure sensor 124.

Upon start up of the engine 64, the crank gear sensor 132 waits until the indicator 88 passes by, and then begins counting teeth. The second piston 96 reaches TDC when tooth 6 passes by the crank gear sensor 132, and the first piston 92 reaches TDC when tooth 10 passes by the crank gear sensor 132.

The processor 128 measures the time period during which three groups of teeth pass by the sensor 132. The time periods are labeled P1, P2, and P3 in FIG. 3 and correspond to selected groups of teeth passing the crank gear sensor 132. P1 corresponds to teeth 1–3, P2 corresponds to teeth 3–5, and P3 corresponds to teeth 7–9. The processor 128 measures time periods P1 and P2 prior to either of the first and second pistons 92, 96 reaching TDC. P3 is measured before the first piston 92 reaches TDC but after the second piston 96 reaches TDC. It will be appreciated by those skilled in the art that the time periods P1, P2, and P3 may be measured during the passage of teeth other than those identified above. Likewise, the engine 64 could be timed such that the first and second pistons 92, 96 reach TDC at teeth other than teeth 10 and 6, respectively.

After P1 and P2 are measured and stored in the processor's memory, the processor 128 compares P1 and P2. As seen in FIG. 4, if the time period P2 is more than a calibratible period longer than P1, the processor 128 determines that the second piston 96 is in its compression stroke (i.e., causing deceleration of the crankshaft) and is about to reach TDC. In this event, the processor 128 causes the spark plug 112 in the second cylinder 76 to activate at the appropriate time, causing combustion in the second cylinder 76. If the difference between P2 and P1 is not greater than the calibratible period, the processor 128 measures P3 and compares P2 and P3. If P3 is longer than P2 by more than a calibratible period, the processor 128 determines that the first piston 92 is in its compression stroke (i.e., causing deceleration of the crankshaft), and activates the spark plug 112 in the first cylinder 72. Preferably, the calibratible period is set at 8 milliseconds (ms), but it may alternatively be set at any other suitable time period.

If P2 is greater than P3 by more than the calibratible period, the processor 128 determines that the second piston 96 has just passed TDC and is beginning its expansion stroke (i.e., causing acceleration of the crankshaft). The reason that P2 would be greater than P3 is due to the second piston 96 slowing down as it reaches TDC in the compression stroke (time period P2), but then speeding up during the expansion stroke (time period P3). Although there is no combustion to drive the second piston 96 under this scenario, the time period P3 is still less than P2 due to the slow down during the compression stroke. In this event, the processor 128 activates the spark plug 112 in the second cylinder 76, which ignites the air/fuel mixture and aides the expansion stroke of the second piston 96. Although the second piston 96 has already passed TDC and the ideal position for sparking the second cylinder 76, some benefit is still obtained by the slightly late spark.

In the rare occurrence where the processor 128 is unable to determine the phase of the engine 64 in the first rotation of the crankshaft 80, the crank gear sensor 132 again finds the indicator 88, and the above-described process is repeated. If, during operation of the engine, the processor 128 loses track of the engine phase, the crank gear sensor 132 may be used to resynchronize the engine 64 (e.g., again determine the phase of the engine 64).

One advantage of the present system is that it usually is able to determine the phase of the engine 64 in the first rotation of the crankshaft 80 and provide a spark in the appropriate cylinder 72, 76. Another advantage is that the system works well at very low engine speeds, which is the case during engine start up. The present system is also therefore useful in circumstances where the vehicle battery has a low charge, and is unable to rotate the crankshaft 80 at a fast rate during engine start up. The usual starting speed for a motorcycle engine crankshaft is about two hundred (200) rpm. The system of the present invention is capable of working at engine speeds as low as sixty (60) rpm, which is the typical starting speed of an engine at 0° F. Because the system usually permits combustion on the first crankshaft rotation, the crankshaft 80 is driven by internal combustion relatively quickly, reducing the dependency of the engine 64 on a charged battery for start up.

At high engine speeds (e.g., above about 2500 rpm), the processor 128 monitors manifold air pressure ("MAP") in the air intake manifold 116 with the pressure sensor 124. The pressure sensor 124 is more accurate than the crank gear sensor 132 at such high rpm ranges, and the crank gear sensor 132 is more accurate than the pressure sensor 124 at lower rpm ranges. The pressure sensor 124 may be used in either a shared manifold 116, as illustrated, or a dedicated manifold for a particular cylinder 72, 76.

In the illustrated embodiment, as seen in FIG. 3, the intake stroke of the first piston 92 begins at tooth 6 and ends at tooth 22. Preferably, MAP is measured during three consecutive crankshaft 80 rotations when a selected tooth (e.g., tooth 28) near the close of the intake valve for the first cylinder 72 passes the crank gear sensor 132. The first, second, and third values for MAP are stored in the processor's memory, and the processor 128 determines the difference between the second value for MAP and the average of the first and third values for MAP. If the difference is greater than a calibratible pressure, then the lower of the values is determined to be the end of the intake stroke for the first cylinder 72. The processor 128 is then able to determine the engine phase and spark the appropriate cylinder 72, 76 in the fourth rotation of the crankshaft 80. The first and third pressure values are averaged in an effort to account for the variations in MAP during operation of the motorcycle engine 64. Preferably, the calibratible pressure is 5 kPa, but it may be changed to any suitable pressure in alternative embodiments.

In theory, and as an alternative to the preferred method just described, the pressure sensor 124 could be used to determine the phase of the engine 64 after two rotations of the crankshaft 80. In this alternative method, the processor reads and stores a MAP reading during each of two crankshaft rotations. The processor 128 quickly compares the two MAP readings and attributes the lower MAP reading to the intake stroke of one of the pistons. This alternative method is considered within the scope of the present invention. The alternative method would therefore permit sparking the appropriate cylinder 72, 76 in the second rotation of the crankshaft 80, rather than the fourth rotation, as is done in the preferred method.

However, it has been determined that the preferred method is very reliable, and is therefore preferably used. Additionally, since the engine 64 is operating at over 2500 rpm when the phase is determined with the pressure sensor 124, the time period taken for the crankshaft 80 to rotate four times is very small. Therefore, even though the preferred method requires four rotations of the crankshaft 80, the preferred method still permits quick and reliable resynchronization at high engine speeds.

As mentioned above, the pressure sensor 124 may also be used in engines not using the illustrated split or shared manifold 116, 120. For example, the engine may have dedicated or individual air intake manifolds or throttle bores for each cylinder. In this type of engine, the pressure sensor 124 may be mounted on a single intake manifold. When the pressure sensor 124 detects a sufficient vacuum, the processor 128 determines that the piston in the associated cylinder is in its intake stroke. For example, the processor 128 may be programmed to identify an intake stroke when the pressure in the throttle bore drops below the calibratible pressure. Alternatively, a pressure sensor 124 may be provided on each bore, and the processor 128 will be able to determine which of the pistons in the cylinders first executes an intake stroke. Thus, an engine 64 having dedicated throttle bores can resynchronize at high rpm in two crankshaft rotations.

What is claimed is:

1. A method for determining the phase of an engine having first and second pistons operably interconnected with a crankshaft, the method comprising:

measuring a first variable that corresponds to a first rotational speed of the crankshaft prior to either of the pistons reaching an initial top-dead-center;

measuring a second variable that corresponds to a second rotational speed of the crankshaft prior to either of the pistons reaching an initial top-dead-center;

comparing the first and second variables; and determining the phase of the engine based on the comparison of the first and second variables.

2. The method of claim 1, further comprising:

before the first piston reaches top-dead-center and after the second piston reaches top-dead-center, measuring a third variable corresponding to a third crankshaft rotational speed;

comparing the second and third variables; and determining the phase of the engine based on the comparison of the second and third variables.

3. The method of claim 1, wherein said first and second variables are the time taken for the crankshaft to rotate through selected portions of a single rotation.

4. The method of claim 1, further comprising:

mounting on the crankshaft a crank gear having teeth; and positioning a sensor near the crank gear to sense the passage of teeth past the sensor;

wherein measuring a first variable includes measuring the amount of time taken for a first group of teeth to pass by the sensor, and measuring a second variable includes measuring the amount of time taken for a second group of teeth to pass by the sensor.

5. The method of claim 1, wherein the engine includes first and second cylinders in which the first and second pistons, respectively, reciprocate, the method further comprising:

increasing the engine speed to a high rpm;

measuring a pressure value corresponding to the pressure of air entering the engine's cylinders; and determining the phase of the engine based on the pressure value while the engine is operating at high rpm.

6. A method for determining the phase of an engine having first and second pistons operably interconnected with a crankshaft, the method comprising:

measuring a first variable that corresponds to a first rotational speed of the crankshaft;

measuring a second variable that corresponds to a second rotational speed of the crankshaft without the pistons reaching top-dead-center between the measuring of the first and second variables;

comparing the first and second variables; and determining the phase of the engine based on the comparison of the first and second variables.

* * * * *